United States Patent [19]

Winchell et al.

[11] 4,087,104
[45] May 2, 1978

[54] METHOD OF MANUALLY PROPELLING A CAMBERING VEHICLE

[75] Inventors: Frank J. Winchell, Orchard Lake; Klaus O. Winkelmann, Troy, both of Mich.

[73] Assignee: General Motors Corporation, Detroit, Mich.

[21] Appl. No.: 714,901

[22] Filed: Aug. 16, 1976

Related U.S. Application Data

[60] Division of Ser. No. 649,967, Jan. 19, 1976, which is a continuation-in-part of Ser. No. 578,839, May 19, 1975, abandoned.

[51] Int. Cl.² .......................... B62K 5/00; B62M 1/00
[52] U.S. Cl. .................................. 280/210; 280/6.11; 280/12.1; 280/16; 280/221
[58] Field of Search ............ 280/87 R, 36 R, 87.04 R, 280/87.04 A, 87.1, 6.11, 21 R, 21 A, 14, 15, 16, 17, 12.1, 12 H, 111, 112 R, 112 A, 11.3, 282, 283, 200, 210, 218, 220, 221, 224, 233; 180/25 R, 26 R, 41

[56] References Cited

U.S. PATENT DOCUMENTS

| 210,435 | 12/1878 | Root ...................................... 280/210 |
| 887,812 | 5/1908 | Johnson ............................... 280/220 |
| 1,607,972 | 11/1926 | Wagner ................................ 280/7.15 |
| 2,593,974 | 4/1952 | Brown ................................. 280/21 R |
| 3,033,585 | 5/1962 | Marston et al. ....................... 280/16 |
| 3,086,795 | 4/1963 | Hatcher ................................ 280/221 |
| 3,540,750 | 11/1970 | Berger ................................. 280/21 |
| 3,656,775 | 4/1972 | Krautter ............................... 280/21 |
| 3,663,038 | 5/1972 | Hendricks ............................ 280/218 |
| 3,799,565 | 3/1974 | Burtis .................................. 280/16 |

FOREIGN PATENT DOCUMENTS

| 169,408 | 3/1951 | Austria ................................ 280/21 R |
| 701,216 | 3/1931 | France ................................. 280/210 |
| 456,843 | 3/1928 | Germany ............................ 280/281 |
| 370,923 | 12/1938 | Italy .................................... 280/16 |
| 4,942,586 | 11/1974 | Japan ................................... 280/281 |

Primary Examiner—Joseph F. Peters, Jr.
Assistant Examiner—Terrance L. Siemens
Attorney, Agent, or Firm—Charles R. White

[57] ABSTRACT

A cambering vehicle, having an upright main frame supporting a front steerable surface contact means and having a pair of trailing arms pivoted at one end to opposite sides of the main frame and having rear surface contact means mounted at the free ends thereof, is manually propelled by the vehicle operator who stands on foot rest means adjacent the rear wheels and, while camber steering the vehicle in a first curved path centered to one side of the vehicle, shifts his body weight from the outside to the inside foot so that the mass initially turning on a first radius is forced to turn on a smaller radius to increase velocity and conserve angular momentum. This stroking action is repeated as the operator steers the vehicle in a second curved path centered to the opposite side of the vehicle. The sinuous camber steering and body weight shifting strokes are repeated as desired to produce a net forward travel.

4 Claims, 6 Drawing Figures

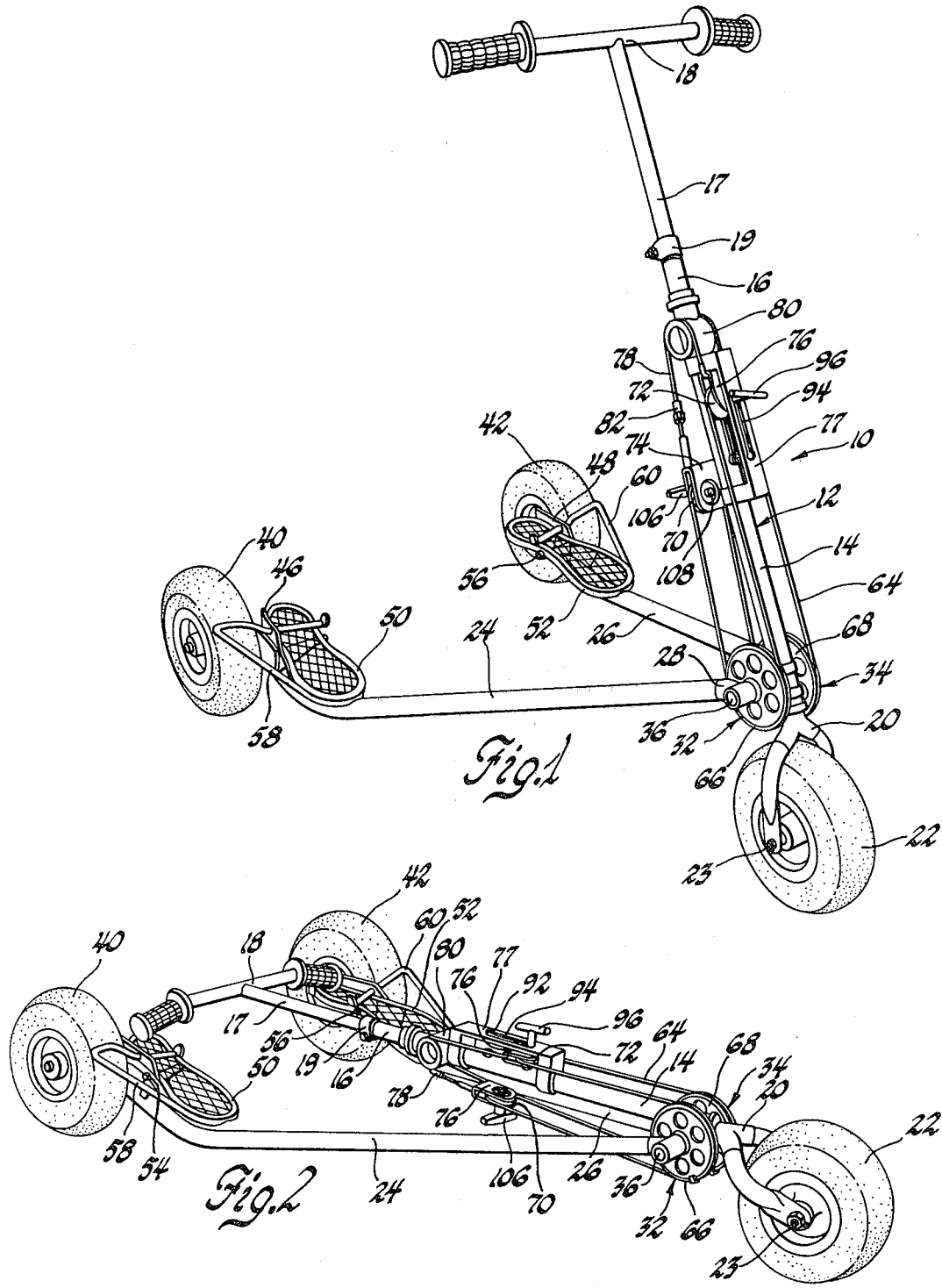

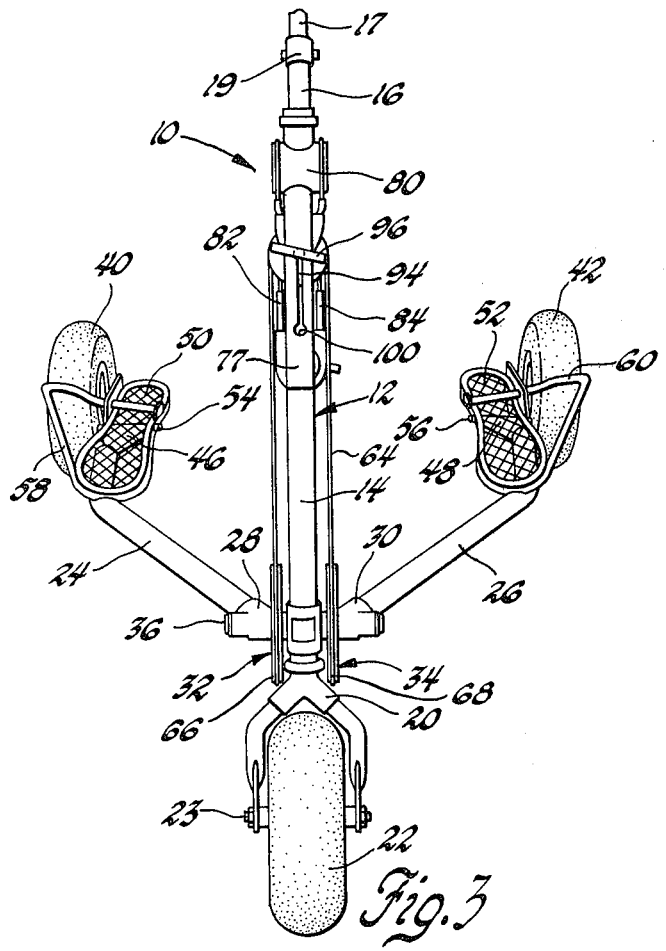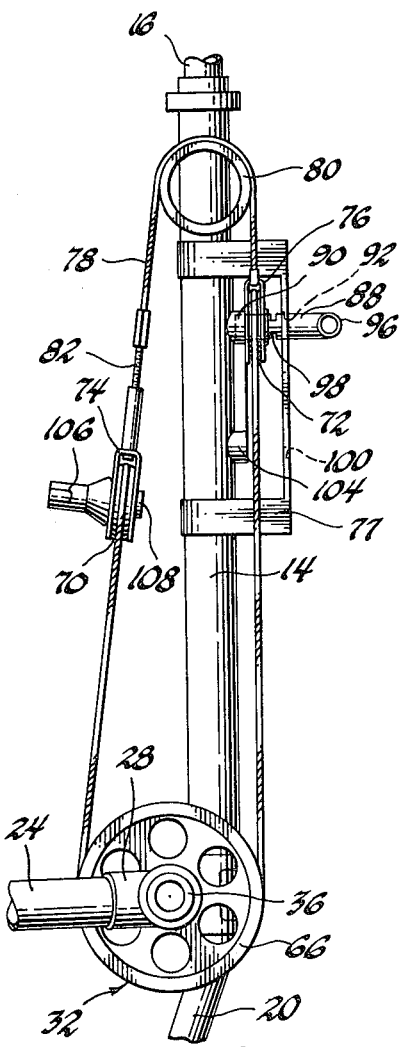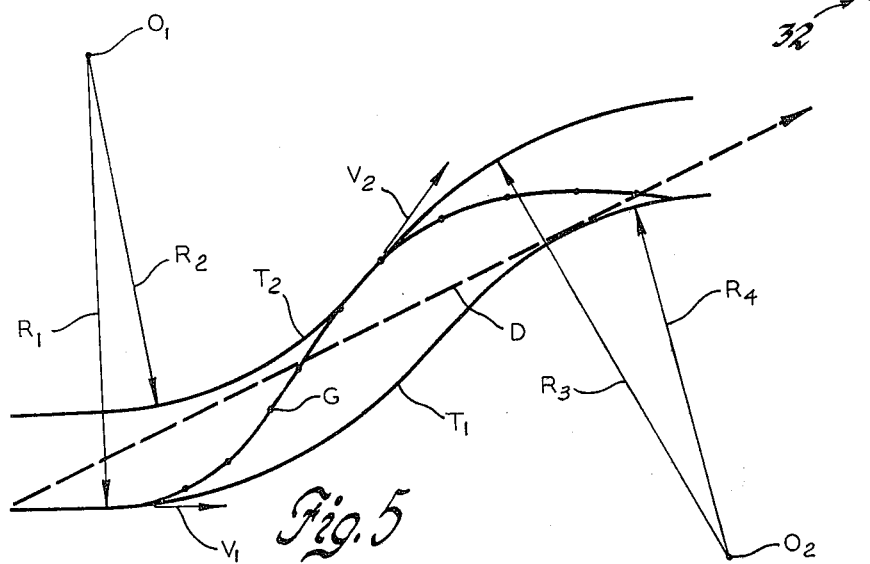

METHOD OF MANUALLY PROPELLING A CAMBERING VEHICLE

This application is a division of U.S. Ser. No. 649,967, filed Jan. 19, 1976 for "Cambering Vehicle", which is a continuation-in-part of Ser. No. 578,839, May 19, 1975, now abandoned.

This invention relates to a method of manually propelling a vehicle and more particularly to a new and improved method of propelling a multi-point surface contact cambering vehicle on which the operator stands and shifts his body weight as he steers the vehicle in a sinuous path to produce a net forward travel.

Prior to the present invention a number of three-point cambering vehicles have been devised to provide an efficient and highly maneuverable personal vehicle suitable for a wide range of uses and for different age groups. While many of these applications have considerable merit they generally support the operator in a manner such that the operator is unable to put a manual input into the vehicle for optimized cambering maneuvers and for manual propulsion in traversing any desired course. Furthermore, these prior vehicles are generally not suitable for any long distance manual propulsion by the vehicle operator while the operator is supported on the vehicle.

The manually propelled cambering vehicle preferably has a main frame portion extending upwardly at a fixed caster angle which supports a steerable front contact such as a ground engaging wheel. The rearward portion of the frame includes a pair of laterally spaced trailing arms which are pivoted to and which are supported on opposite sides of the main frame for limited turning about a horizontal axis. Each arm carries a rear wheel at its free end and the arms are operatively connected to each other and to the main frame by cable and pulley stabilizer means. The vehicle can be selectively manually cambered to either side of the center roll axis and is manually propelled when the operator shifts his weight from one foot to the other as the vehicle is guided in a sinuous path to produce a net forward travel. In another preferred construction the vehicle may be equipped with ice skates as contact for support surfaces instead of wheels. These vehicles have been described in co-pending U.S. application Ser. No. 649,967 filed Jan. 19, 1976 for Cambering Vehicle which is hereby incorporated by reference.

It is accordingly a feature, object and advantage of this invention to provide a new and improved method of manually propelling a three-point cambering vehicle having an upright main frame, a steerable front contact, a pair of trailing arms pivoted at their forward ends to the main frame and extending rearwardly therefrom and having free end portions each mounting a support surface contact as well as foot receiving means to allow the operator to naturally stand erect on the vehicle and grasp the steering mechanism to camber the vehicle about alternating left and right centers while shifting his body weight into the turns to effect a net forward propulsion of the vehicle.

Another feature, object and advantage of this invention is to provide a new and improved method of operating a three-point surface contact cambering vehicle in which the vehicle operator, standing on the vehicle, provides alternating physical stroking inputs into the left and right trailing arms while turning the vehicle about a series of left and right side turning centers to thereby manually propel the vehicle on a course located between the turning centers.

A further feature, object and advantage of this invention is to provide a new and improved method of manually propelling a three-wheel cambering vehicle which allows the operator to naturally stand on the vehicle and negotiate a series of left and right turns while continuously transferring his body weight toward turning centers to conserve angular momentum and thereby effect a resultant forward direction of vehicle travel.

These and other features, objects and advantages of this invention will be more apparent from the following detailed description and drawing in which:

FIG. 1 is a perspective view of a manually propelled vehicle according to this invention is an upright or standing position.

FIG. 2 is a perspective view of the vehicle of FIG. 1 in a collapsed position.

FIG. 3 is a front perspective view of a portion of the vehicle of FIG. 1.

FIG. 4 is an enlarged side elevation view of a portion of the front frame of the vehicle of FIG. 1.

FIG. 5 is a diagram illustrating a preferred mode of operation of the vehicle shown in FIG. 1.

Figure 6:
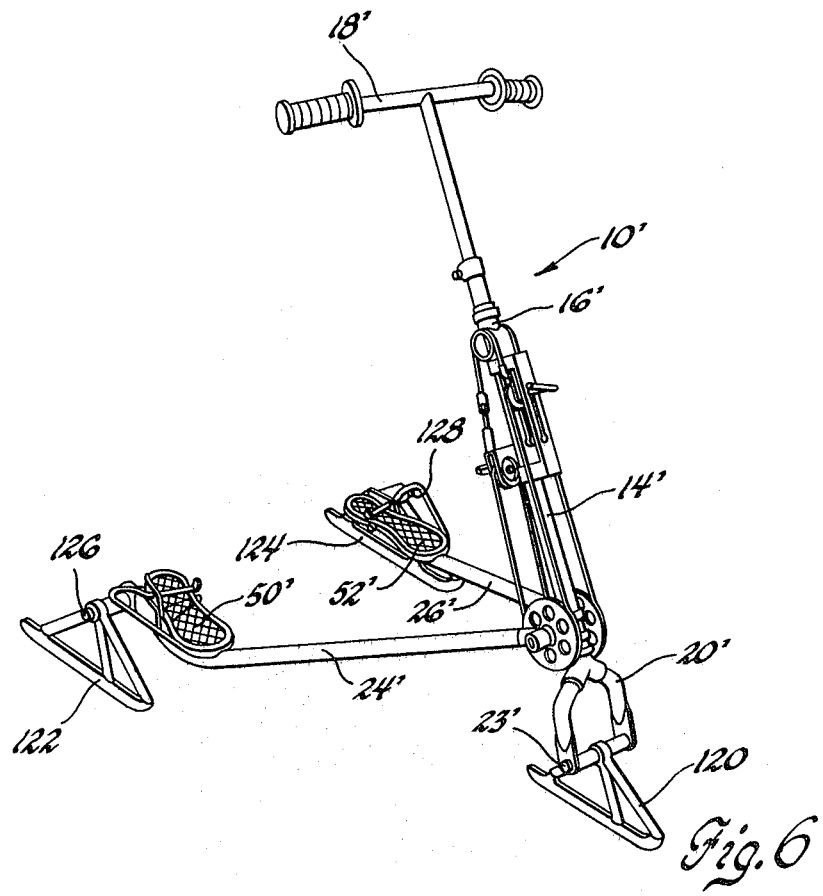
FIG. 6 is a perspective view of a vehicle similar to the vehicle shown in FIG. 1 but having ice skates instead of wheels as support contacts.

Turning now in greater detail to the drawing, FIGS. 1 through 4 illustrate a three-wheel cambering vehicle according to this invention which can be readily propelled in a forward direction by the input of natural physical forces from the vehicle operator through the timed shifting of the operator's weight from one foot to the other which is coordinated with the left and right cambered steering of the vehicle in a sinuous path. This preferred embodiment of the vehicle is identified in the drawing by reference numeral 10 and has a front frame portion 12 comprising an inclined and elongated cylindrical main frame 14 that axially locates and rotatably supports a tubular steering shaft 16 extending therethrough. The upper end of steering shaft 16 telescopically mounts the centralized connector shaft 17 of handle bar assembly 18. A clamp 19 carried by the upper end of shaft 16 can be constricted by conventional threaded fastener means to hold the handle bar assembly in adjusted position. The steering shaft 16 has a lower bifurcated end 20 which provides a fork for steerable front wheel 22. This wheel rotates on an axle 23 which extends transversely through and is supported by the fork. The vehicle has a pair of tubular trailing arms 24 and 26 which respectively have their forward ends secured in sockets 28 and 30 of right and left side pulley assemblies 32 and 34. The pulley assemblies 32 and 34 are mounted for turning movement on a horizontally extending pivot shaft 36 which is supported by the front frame portion 12. With this construction each arm is mounted for up and down swinging movement on the axis provided by the pivot shaft 36 and on opposite sides of main frame 14.

Right and left rear wheels 40 and 42 are rotatably mounted on axles which extend laterally and outwardly from the free end of trailing arms 24 and 26 respectively. In addition to supporting the rear wheels 40 and 42 the end of arms 24 and 26 have mounting brackets 46 and 48 secured respectively thereto for right and left foot pads 50 and 52 adapted to support a vehicle operator. In this connection the vehicle operator may place his feet on the foot pads and stand in a natural manner while grasping the right and left hand grips of the handle bar assembly. As best shown in FIGS. 1-3, the foot pads 50 and 52 are located laterally inboard of the rear wheels 40 and 42 and are tiltably mounted on pivot pins 54 and 56 carried by brackets 46 and 48, respectively. Foot pad 50 disposed inboard of wheel 40 has an outwardly extending tubular friction brake member 58 secured thereto that directly engages the outer periphery of the wheel 40 when the pad is rocked rearwardly on pivot pin 54 by the operator to effect braking of wheel 40. In a forward tilt position of pad 50 the brake member 58 is spaced from wheel 40 so that the wheel can freely rotate. In a like manner, foot pad 52 has an outwardly extending tubular brake member 60 secured thereto which is adapted to directly engage and brake the left rear wheel 42 when pad 52 is rocked rearwardly on pivot pin 56 by the vehicle operator. In the forward tilt position of this pad, the brake member is spaced from the wheel so that it may roll freely.

The trailing arms 24 and 26 are interconnected in a way so that the swinging of one arm on pivot shaft 36 in one direction will tend to swing the other arm automatically in the opposite direction. To this end the arms are mechanically interconnected by an endless cable 64 which extends around right and left side trailing arm pulleys 66 and 68 and a pair of transverse upper pulleys 70 and 72. Cable 64 leads from right side pulley 66 around pulley 70 and from pulley 70 around left side pulley 68. From pulley 68 the cable leads around upper pulley 72 and back to the right side pulley 66. Cable 64 is connected to pulleys 66, 68 and 70 by any suitable means to prevent slippage. The pulley 66 forms part of pulley assembly 32 and is rotatable by trailing arm 24; likewise, pulley 68 is part of pulley assembly 34 and is turned by rotation of trailing arm 26. Pulleys 70 and 72 are rotatably supported on clevises 74 and 76 which are adjustably interconnected by a cable 78. As shown, the cable 78 loops through the upper end of clevis 76 and, straddling the tubular main frame 14, extends around the right and left sides of a transversely extending tubular shoulder 80 secured to the main frame 14. The terminal ends of cable 78 are connected by threaded cable tensioners 82 and 84 to the clevis 74.

Clevis 76 and its pulley 72 are adjustably mounted with respect to a bracket 77 secured to and extending along an upper portion of elongated tubular main frame 14. As shown, the pulley 72 and its associated clevis 76 are supported by a pivot pin 88 which extends through and rotatably supports pulley 72. The inner end of the pin 88 is removably seated in a cylindrical bearing 90 integral with tubular main frame 14 and extends outwardly from this bearing through the circular upper eye 92 of a keyhole slot 94. Pin 88 terminates in a handle 96 and has a necked or slotted intermediate portion 98 which fits within the narrow track of the keyhole slot 94. With this construction the operator can grasp handle 96 and pull the end of pin 88 out of bearing 90. The handle 96 can be subsequently turned to align the slotted portion 98 of the pin with the narrow track of the keyhole slot so that the clevis 76 and pulley 72 can be lowered as the main frame 12 is being tilted from the vehicle operating position of FIG. 1 to the stowed position shown in FIG. 2. When the lower eye 100 of the keyhole slot is reached, the pin 88 can be pushed inwardly into engagement with a lower bearing 104 integral with main frame 14. In this position the slotted portion 98 of the pin 88 is misaligned with respect to the narrow track of the keyhole slot so that the vehicle is latched in the stowed position. In a similar manner described in connection with the folding of the vehicle, the pin 88 can be disengaged with the lower bearing 104 and the pin and clevis moved upwardly as the main frame is turned from the stowed position of FIG. 2 to the operating position of FIG. 1.

Pulley 70 can be prevented from turning to thereby hold the vehicle in an upright position by the manual turning of locking handle 106. By turning this handle, threaded means 108 is drawn toward the handle so that the sides of clevis 74 frictionally engage the sides of pulley 70 to lock the trailing arms together for vehicle parking or for stowage purposes.

In one preferred mode of operation of this embodiment of the invention, the operator can step on one foot pad using his other foot to push off the support surface to give the vehicle an initial velocity, shown as vector $V_1$ in FIG. 5. After pushing off, the operator places his feet on their respective foot pads so that operator input can be imparted into the vehicle for forward propulsion. Initially the operator distributes his weight to one foot and camber steers the vehicle in an arcuate path about a center point $O_1$ shown in the sinuous right and left tire paths $T_1$ and $T_2$. With the vehicle turning on such an arcuate path, the right rear wheel has a turning radius $R_1$ which is greater than the turning radius $R_2$ of the inside or left rear wheel. While holding the circular path of the vehicle substantially constant during this turning action and as he leans the vehicle into the turn the operator shifts his weight from his right to his left foot and thus to the left wheel. The shifting of the operator's center of gravity during this action is shown by curved path G in FIG. 5. Since the angular momentum has not changed, the shift of the operator's mass to a smaller radius will naturally result in an increase in vehicle velocity indicated as vector $V_2$. The operator subsequently cambers and steers the vehicle in an opposite direction so that it describes an arcuate path about another center point such as center point $O_2$. Since at the beginning of the second half of the operating cycle the mass of the operator is over the left rear wheel, velocity can be again increased by the operator shifting his weight from his left to his right foot. Thus the operator's mass is moved from radius $R_3$ to the smaller radius $R_4$ to again increase net velocity. By repeating this action a net forward travel of the vehicle is achieved as indicated by the directional arrow D in FIG. 5. The cambering of the vehicle during the work cycle facilitates operation. With cambering, the track of the vehicle is widened so that the amount of work per cycle is increased. The self propulsion is most effective on flat smooth surfaces where speeds approaching 20 mph may be obtained.

While the manually propelled cambering vehicle has been thus far illustrated and described with wheels providing the three-point contact, ice runners or skates may be readily substituted for the wheels. Such a modification is shown in FIG. 6 in which vehicle 10' has frame and stabilizer elements which are basically the same as corresponding elements of the vehicle 10 of the FIG. 1 construction. This particular modification has a main frame 14' that supports tubular steering shaft 16'. Manual handle bar assembly 18' is operatively connected to the upper end of the steering shaft so that the steering shaft can be manually turned by the vehicle operator. The lower bifurcated end 20' of the steering shaft supports the transverse axle 23' on which ice skate 120 is mounted. In a like manner right and left ice skates 122 and 124 are secured on right and left axles 126 and 128 extending laterally from the end of the trailing arms 24' and 26' respectively. The cable and pulley stabilizer interconnection is the same as described in connection with the FIG. 1 construction so that further detailed description of this embodiment is not necessary.

In operation on a supporting ice surface, an operator (not shown) can distribute his body weight to the right and left foot pads 50' and 52' and provide a natural shift in weight between these two laterally spaced supports while manually steering the vehicle in a sinuous course to produce a net forward travel as described in connection with FIG. 5. As with the wheeled version, cambering of the vehicle is preferred when it is being powered by the successive weight shifts of the operator. Thus, as the operator shifts his weight from one foot to the other the vehicle is progressively rolled or cambered so that the track of the rear wheels is progressively increased (not illustrated in FIG. 5) during each half of the work cycle so that the amount of work is increased.

The detailed description and illustrations of the preferred embodiments of this invention for the purpose of explaining the principles and methods thereof are not to be considered as limiting or restricting the invention since many modifications may be made by the exercise of skill in the art without departing from the scope of the invention as set forth in the following claims.

What is claimed is:

1. A method of manually propelling a cambering vehicle having a longitudinally extending roll axis and a manually steerable front contact means operatively mounted on a main frame and engaging a support surface and further having a pair of laterally spaced trailing arms interconnected by an equalizer mechanism and pivoted to the main frame of the vehicle for up and down swinging movement each with a rear contact means pivoted for turning movement about an axis extending laterally at a fixed angle with respect to an associated one of said arms and each said contact engaging the support surface and each of said arms having foot rest means adjacent the end thereof so the operator may stand in a natural upright position with his feet laterally spaced apart on the trailing arms and manually steer the front contact means comprising the following operator steps: imparting an initial velocity to the vehicle, physically standing erect on the vehicle facing forwardly with the rear contacts providing tracks spaced a selected distance apart and with each foot on a corresponding foot rest means, manually steering the steerable front contact means, cambering the vehicle and contacts to one side of the roll axis and steering the vehicle in a first arcuate path and thereby concurrently widening operator foot spacing and the tracks of the rear contacts as a first of said arms swings in a first direction relative to a second of said arms which correspondingly relatively swings in a second and opposite direction, applying the majority of the body weight initially on a first foot located proximate to the outside of the first arcuate path while initially cambering the vehicle, progressively and gradually shifting body weight from the first foot to the second foot located proximate to the inside of the first arcuate path while the first arcuate path is being executed to effect an increase in vehicle velocity, completing the first arcuate path with the vehicle reaching an upright stance and with the spacing of the rear contacts approximating said selected distance, cambering the vehicle and contacts to the other side of the roll axis and camber steering the vehicle in a second arcuate path having a reverse curvature as compared to said first arcuate path, thereby concurrently widening operator foot spacing and tracks of the rear contacts as the first of said arms relatively swings in the second direction and the second of said arms relatively swings in the first direction, and progressively and gradually shifting the body weight from the second foot to the first foot while the second arcuate path is being executed to further effect an increase in vehicle velocity in a net forward direction of travel.

2. A method of manually propelling a cambering vehicle which can be manually rolled to either side of a longitudinally extending roll axis, said vehicle having a manually steerable front surface contact means operatively mounted on a main frame and further having a pair of trailing arms pivoted to opposite sides of the main frame for equal and opposite up and down swinging movement and further having a rear contact means on the free ends thereof for full time support of the vehicle through engagement with the support surface and pivoted for turning movement about an axis extending laterally at a fixed angle with respect to an associated one of said arms and each said contact and each of said arms having foot rest means thereon so the vehicle operator may stand erect with his feet laterally spaced apart a first distance on the foot rest means of the vehicle and steer the front contact means comprising the steps of standing erect in a natural manner on the foot rest means gripping the steering means for the steerable front contact with the hands, imparting an initial velocity to the vehicle, distributing the major portion of the body weight to a first side of the vehicle roll axis by supporting the body weight on one foot, cambering the vehicle and contacts toward the second side of said roll axis while steering the vehicle in an arcuate path with respect to a first turning center on said second side of said roll axis, relatively swinging a first of said arms in a first direction and a second of said arms in a second direction equal and opposite to said first direction as the vehicle is cambered to thereby increase the spacing between the feet of operator, proceeding along the first arcuate path of the vehicle while gradually transferring the body weight from the first foot to the second foot so that the shift in mass to a smaller turning radius increases vehicle velocity, completing the first arcuate path by bringing the vehicle to a substantially upright position with the operator's feet being spaced apart by an amount approximating said first distance, cambering the vehicle and contacts toward the first side of the roll axis while steering the vehicle in a second arcuate path about a second turning center on the first side of the vehicle roll axis and increasing the spacing of the feet of the operator as the first of said arms swings in a second direction and the second of said arms swings in the first direction equal and opposite to said second direction, thereby increasing the spacing of the feet of the operator proceeding along the second arcuate path while gradually transferring the weight from the second foot back to the first foot as the vehicle is leaned into the second turn so that the shift in mass is again to a smaller radius to further increase vehicle velocity, and subsequently camber steering the vehicle about a third turning point ahead of the first turning center and again transferring weight from the first foot back to the second foot so that the net travel of the vehicle is in a forward direction.

3. A method of manually propelling a cambering vehicle having a manually steering front surface contact operatively mounted on a main frame and further having a pair of laterally spaced trailing arms pivoted to opposite sides of the main frame for equal and opposite up and down swinging movement and each of said arms further having a rear contact on the free end thereof for full time vehicle support and contact with a support surface, each said rear contact being pivoted on a laterally extending axis fixed with respect to an associated one of said arms and each of said arms and having foot rest means thereon adjacent each of the rear contacts so the vehicle operator may stand with his feet spread apart on the vehicle and manually steer the front contact comprising the steps of standing upright in a natural manner on the foot rest means with the feet laterally spaced a selected distance apart and with body weight distributed substantially equally to each foot and manually gripping the steering means for the steerable front contact with the hands, imparting an initial velocity to the vehicle in a generally forward direction, distributing the major portion of the body weight to one side of the vehicle by supporting the body weight on one foot, steering the vehicle in a first arcuate path with respect to a first turning center on the other side of the vehicle while the vehicle and contacts are leaned into the turn provided by said path and the distance between the feet is increased, gradually transferring the body weight from the first foot to the second foot as the vehicle proceeds along said first arcuate path so that the shift in mass of the operator's body is to a smaller turning radius to thereby increase vehicle velocity, by rolling the vehicle to an upright position wherein the feet of the operator are spaced a distance approximating said first distance completing the first arcuate path, steering the vehicle in a second arcuate path generally opposite to said first mentioned arcuate path while the vehicle and contacts are leaned into the turn provided by said second path and while again increasing the distance between the feet, transferring the weight from the second foot back to the first foot as the vehicle proceeds along said second arcuate path so that the shift in mass of the operator's body is again to a smaller radius to further increase vehicle velocity and to produce a net forward direction of travel.

4. A method of manually propelling a three wheeled cambering vehicle which can be manually cambered to either side of a center roll axis of a vehicle having a manually steerable front wheel means operatively mounted on a main frame and engaging a support surface and further having a pair of trailing arms pivotally connected at their forward ends to the main frame of the vehicle each with a road wheel means pivoted for turning movement about an axis extending laterally at a fixed angle with respect to an associated one of said arms and each said contact engaging the support surface and each of said arms having foot rest means adjacent the rear end thereof so the operator may stand erect on the trailing arms and manually steer the front wheel means comprising the following operator steps: imparting an initial velocity to the vehicle, physically standing in a natural erect manner with each foot on a corresponding foot rest means and spaced apart by a first distance, manually steering the steerable front wheel means increasing the spacing between the feet relative to the support surface by camber steering the vehicle in a first arcuate path with the rear wheel means cambering by amounts equal to vehicle roll, initially exerting the majority of the body weight on a first foot located proximate to the outside of the arcuate path, gradually shifting body weight from the first foot to the second foot located proximate to the inside of the first arcuate path while the first arcuate path is being executed to effect an increase in vehicle velocity, completing the camber steering in the first arcuate path and thereby spacing the feet apart by a distance approximating said first distance, subsequently increasing the spacing between the feet relative to the support surface by camber steering the vehicle in a second arcuate path having a reverse curvature as compared to said first arcuate path and with the rear wheel means cambering by amounts equal to vehicle roll, and shifting the body weight from the second foot to the first foot as the second arcuate path is being executed to further effect an increase in vehicle velocity in a net forward direction of travel.

* * * * *